United States Patent
He et al.

(10) Patent No.: US 11,743,749 B2
(45) Date of Patent: Aug. 29, 2023

(54) FLEXIBLE DOWNLINK CONTROL SIGNAL MONITORING IN WIRELESS COMMUNICATIONS

(71) Applicant: Apple Inc., Cupertino, CA (US)

(72) Inventors: Hong He, Cupertino, CA (US); Pengkai Zhao, San Jose, CA (US); Wei Zeng, San Diego, CA (US); Dawei Zhang, Saratoga, CA (US); Haitong Sun, Irvine, CA (US); Yuchul Kim, Santa Clara, CA (US); Chunhai Yao, Beijing (CN); Yushu Zhang, Beijing (CN); Wei Zhang, Santa Clara, CA (US); Weidong Yang, San Diego, CA (US); Chunxuan Ye, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/059,187

(22) PCT Filed: Nov. 28, 2019

(86) PCT No.: PCT/CN2019/121551
§ 371 (c)(1),
(2) Date: Nov. 25, 2020

(87) PCT Pub. No.: WO2021/102785
PCT Pub. Date: Jun. 3, 2021

(65) Prior Publication Data
US 2021/0368368 A1 Nov. 25, 2021

(51) Int. Cl.
*H04W 24/08* (2009.01)
*H04L 5/00* (2006.01)

(52) U.S. Cl.
CPC ........... *H04W 24/08* (2013.01); *H04L 5/0053* (2013.01)

(58) Field of Classification Search
CPC . H04W 24/08; H04W 76/28; H04W 72/1289; H04W 72/042; H04W 72/0453; H04L 5/0053; H04L 5/001; H04L 5/0098; Y02D 30/70
See application file for complete search history.

(56) References Cited

U.S. PATENT DOCUMENTS

2019/0289562 A1* 9/2019 Brown ................ H04W 74/085
2021/0376985 A1* 12/2021 Zhou ................ H04W 72/1268
(Continued)

FOREIGN PATENT DOCUMENTS

CN 103402245 11/2013
CN 105917607 A 8/2016
(Continued)

OTHER PUBLICATIONS

International Search Report and Written Opinion for PCT/CN2019/121551, dated Aug. 26, 2020, 10 pages.
(Continued)

*Primary Examiner* — Hashim S Bhatti
(74) *Attorney, Agent, or Firm* — Kowert, Hood, Munyon, Rankin & Goetzel, P.C.

(57) ABSTRACT

A device may wirelessly communicate with a number of different cells used in a carrier aggregation. The device may monitor physical downlink control channels (PDCCHs) on the different cells, dynamically switching between a dormant monitoring state (DS) and an active monitoring state (AS). In the DS, the UE may not monitor any PDCCH candidates on the active secondary SCells corresponding to the DS, or it may monitor PDCCH candidates in the search space (SS) set with the largest monitoring periodicity among the multiple SS sets on the active bandwidth part (BWP). In the AS, the UE may monitor a set of PDCCH candidates in physical resources configured by higher layers on the BWPs. Switching from one monitoring state to another may be facilitated through the use of a new downlink control
(Continued)

information (DCI) format without data scheduling, a modified existing DCI format with data scheduling, and/or use of a DS timer.

20 Claims, 10 Drawing Sheets

(56) References Cited

U.S. PATENT DOCUMENTS

2022/0039009 A1* 2/2022 Iyer .................. H04W 72/042
2022/0124615 A1* 4/2022 Shi .................... H04W 52/0229

FOREIGN PATENT DOCUMENTS

KR  10-2019-0111767 A   10/2019
WO      2019099880 A1    5/2019

OTHER PUBLICATIONS

Samsung on Scell Activation/Decactivation 3GPP TSG RAN WG1 #96bis, R1-1904401; Apr. 12, 2019.
3GPP 3rd Generation Partnership Project; Technical Specification Group Radio Access Network; NR; Study on UE Power Saving(Release 16) 3GPP TR 38.840 V1.0; Mar. 31, 2019.
VIVO Efficient Scell activation 3GPP TSG RAN WG1 #96bis, R1-1904113; Apr. 14, 2019.
Partial Supplementary European Search Report for EP Patent Application No. 19929187.3; 12 pages; dated May 23, 2022.
Ericsson "Reduced latency Scell management for NR-NR CA"; 3GPP TSG-RAN WG1 #97 R1-1907333; Reno, USA; 5 pages; May 13-17, 2019.
VIVO "Efficient Scell activation"; 3GPP TSG RAN WG1 #98 R1-1908180; Prague, CZ; 4 pages; Aug. 26-30, 2019.
Notice of Preliminary Rejection; Korean Patent Application No. 10-2020-7033801; 11 pages; dated May 12, 2022.
Qualcomm Inc "SCell Dormancy and Fast sCell Activation" 3GPP TSG RAN WG1 #99 R1-1912980; Reno, USA; 13 pages; Nov. 9, 2019.
Notice of Allowance for KR Patent Application No. 10-2020-7033801; 5 pages; dated Nov. 14, 2022.
ZTE Corporation et al. "Further Consideration on Fast SCell Activation"; 3GPP TSG-RAN WG2 Meeting #107bis R2-1913490; Chongqing, CN; 8 pages; Sep. 14, 2019.
Office Action for CN Patent Application No. 201980035734.4; dated Apr. 29, 2023.

* cited by examiner

| Value of Dormant State Request (DSR) field | Description |
|---|---|
| 00 | No DS to AS is triggered |
| 01 | DS to AS is trigged for a first ($1^{st}$) set of SCells configured by higher layers |
| 10 | DS to AS is trigged for a second ($2^{nd}$) set of SCells configured by higher layers |
| 11 | DS to AS is trigged for a third ($3^{rd}$) set of SCells configured by higher layers |

Table 1
[DSR field in DCI format; (K=2)]

| Value of Dormant State Request (DSR) field | Description |
|---|---|
| 00 | No DS to AS is triggered |
| 01 | DS to AS is trigged for a first ($1^{st}$) set of {SCell,BWP} pairs configured by higher layers |
| 10 | DS to AS is trigged for a second ($2^{nd}$) set of {SCell,BWP} pairs configured by higher layers |
| 11 | DS to AS is trigged for a third ($3^{rd}$) set of {SCell,BWP} pairs configured by higher layers |

Table 2
[DSR field in DCI format; (K=2)]

FIG. 10

FLEXIBLE DOWNLINK CONTROL SIGNAL MONITORING IN WIRELESS COMMUNICATIONS

PRIORITY CLAIM

This application is a national phase entry of PCT application number PCT/CN2019/121551, entitled "Flexible Downlink Control Signal Monitoring in Wireless Communications," filed Nov. 28, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications, and more particularly to flexible downlink control signal monitoring in wireless communications, for example in 3GPP New Radio (NR) communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc. A next telecommunications standard moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

In general, wireless communication technologies, such as cellular communication technologies, are substantially designed to provide mobile communication capabilities to wireless devices. Furthermore, in addition to the communication standards mentioned above, there also exist extensions aimed at boosting transmission coverage in cellular networks. One example of such an extension is carrier aggregation (CA) which refers to the process of aggregating two or more component carriers (CCs) in order to support wider transmission bandwidths, e.g. bandwidths of up to 100 MHz. A wireless communication device or user equipment device (UE) may simultaneously receive or transmit on one or multiple CCs depending on the UE's capabilities. When CA is configured, the UE may maintain one RRC connection with the network. The serving cell managing the UE's RRC connection is referred to as the Primary Cell (PCell), and Secondary Cells (SCells) together with the PCell may form a set of serving cells. In CA, a UE may be scheduled via PDCCH over multiple serving cells simultaneously. Cross-carrier scheduling with the Carrier Indicator Field (CIF) allows the PDCCH of a serving cell to schedule resources on another serving cell. That is, a UE receiving a downlink assignment on one CC may receive associated data on another CC. One sub-category of inter-band carrier aggregation includes at least one of the secondary carriers operating in an unlicensed (e.g. 5 GHz) band over which communications according to another radio access technology (RAT) may also be taking place.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. The UEs, which may be mobile telephones or smart phones, portable gaming devices, laptops, wearable devices, PDAs, tablets, portable Internet devices, music players, data storage devices, or other handheld devices, etc. are generally powered by a portable power supply, e.g., a battery and may have multiple radio interfaces that enable support of multiple radio access technologies (RATs) as defined by the various wireless communication standards (LTE, LTE-A, NR, Wi-Fi, BLUETOOTH™, etc.). There are ongoing efforts not only to reduce power consumption required to perform wireless communications in order to improve the battery life of wireless devices, but also to achieve efficient use of wireless communication resources and thereby increase system efficiency. However, the activation/deactivation of secondary cells (SCells) oftentimes incurs relatively large delays, e.g. in the tens of milliseconds range (e.g. 24 ms to 32 ms). Such large delays pose a risk for the network to frequency deactivate a SCell. On the other hand, keeping a SCell in an active state may result in excessive power consumption at least due to unnecessary physical downlink control channel (PDCCH) monitoring even without data reception.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for support in various devices, e.g. wireless communication devices, for performing flexible downlink control signal monitoring during wireless communications, e.g. during 3GPP LTE and/or NR communications. Embodiments are further presented herein for wireless communication systems containing wireless communication devices (UEs) and/or base stations and access points (APs) communicating with each other within the wireless communication systems.

Pursuant to the above, a device may wirelessly communicate according to a first radio access technology (RAT) with a number of different cells used in a carrier aggregation.

The device may monitor physical control channels (e.g. PDCCHs) on (or for) any one or more of a number of cells used in the carrier aggregation, and may dynamically switch between a dormant state (DS) and an active state (AS) for monitoring the PDCCHs. In the DS, the UE may not monitor any PDCCH candidates on (or for) the active secondary cell or cells (SCells) corresponding to the DS. Alternately, while in the DS, the UE may monitor PDCCH candidates in the search space (SS) set with the largest monitoring periodicity among the multiple SS sets configured by higher layers (e.g. via RRC signaling) on the active bandwidth part (BWP). In the AS, the UE may monitor a set of PDCCH candidates in physical resources configured by higher layers on the active BWPs. In some embodiments, the UE may maintain separate respective monitoring states (either DS or AS at any particular given time) for individual respective SCells in the carrier aggregation or for respective groups of SCells in the carrier aggregation or for respective {SCell, BWP} pairs in the carrier aggregation.

The monitoring state switching may be facilitated through the use of a new downlink control information (DCI) format without data scheduling, a modified existing DCI format with data scheduling, and/or use of a DS timer.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 10 shows tables illustrating different exemplary DSR field assignments in a DCI format for a specified number of DSR bits, according to some embodiments;

Figure 1:
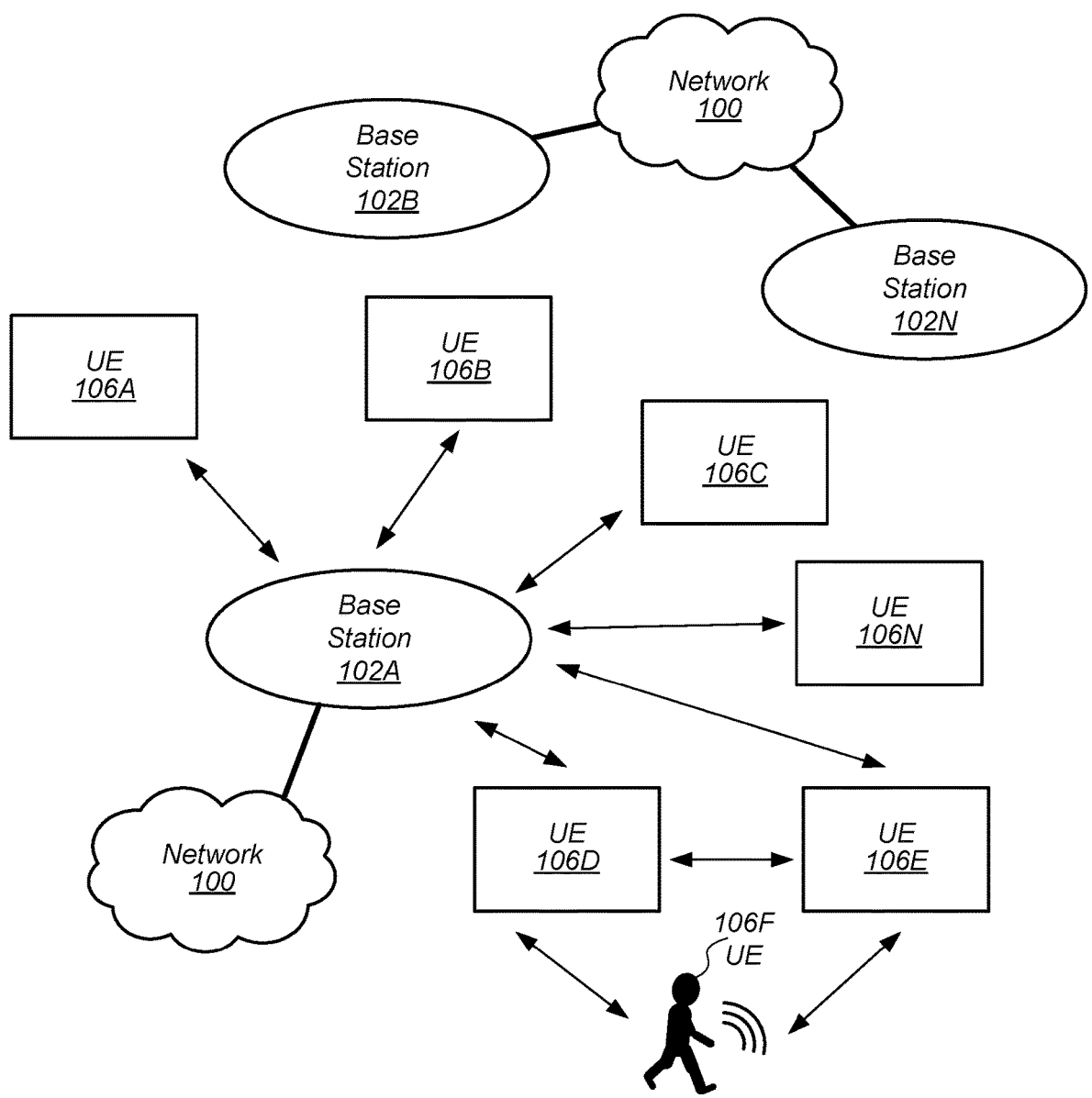
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point
APN: Access Point Name
APR: Applications Processor
AS: Active State
ASN.1: Abstract Syntax Notation
BS: Base Station
BSR: Buffer Size Report
BSSID: Basic Service Set Identifier
C-RNTI: Cell RNTI
CBRS: Citizens Broadband Radio Service
CBSD: Citizens Broadband Radio Service Device
CCA: Clear Channel Assessment
CCE: Control Channel Element
CMR: Change Mode Request
CS: Circuit Switched
CS-RNTI: Configured Scheduling RNTI
DCI: Downlink Control Information
DL: Downlink (from BS to UE)
DRX: Discontinuous Reception
DSDS: Dual SIM Dual Standby
DS: Dormant State
DSR: Dormant State Request
DYN: Dynamic
EDCF: Enhanced Distributed Coordination Function
FDD: Frequency Division Duplexing
FO: First-Order state FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
KPI: Key Performance Indicator
LAN: Local Area Network
LBT: Listen Before Talk
LCID: Logical Channel Identification (Identifier)
LQM: Link Quality Metric
LTE: Long Term Evolution
MAC: Media Access Control
MCS-RNTI: Modulation Coding Scheme RNTI
MNO: Mobile Network Operator
NB: Narrowband
OOS: Out of Sync
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSD: Power Spectral Density
PSS: Primary Synchronization Signal
PT: Payload Type
QBSS: Quality of Service Enhanced Basic Service Set
QI: Quality Indicator
RAT: Radio Access Technology
RF: Radio Frequency
RNTI: Radio Network Temporary Identifier
ROHC: Robust Header Compression
RRC: Radio Resource Control
RTP: Real-time Transport Protocol
RTT: Round Trip Time
RX: Reception/Receive
SAS: Spectrum Allocation Server
SID: System Identification Number
SIM: Subscriber Identity Module
SGW: Serving Gateway
SMB: Small/Medium Business
SSS: Secondary Synchronization Signal
SUL: Supplementary Uplink
TBS: Transport Block Size
TCP: Transmission Control Protocol
TDD: Time Division Duplexing
TX: Transmission/Transmit
UE: User Equipment
UL: Uplink (from UE to BS)
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In cellular radio communications, signal and data transmissions may be organized according to designated time units of specific duration during which transmissions take place. For example, in LTE, transmissions are divided into radio frames, each radio frame being of equal (time) duration (e.g. each radio frame may be 10 ms). A radio frame in LTE may be further divided into ten subframes, each subframe being of equal duration, with the subframes designated as the smallest (minimum) scheduling unit, or the designated time unit for a transmission. Similarly, a smallest (or minimum) scheduling unit for 5G NR (or NR, for short) transmissions is referred to as a slot. Accordingly, as used herein, the term "slot" is used to reference a smallest (or minimum) scheduling time unit for the wireless communications being described for NR communications. However, as noted above, in different communication protocols such a scheduling time unit may be named differently, e.g. a "subframe" in LTE, etc.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
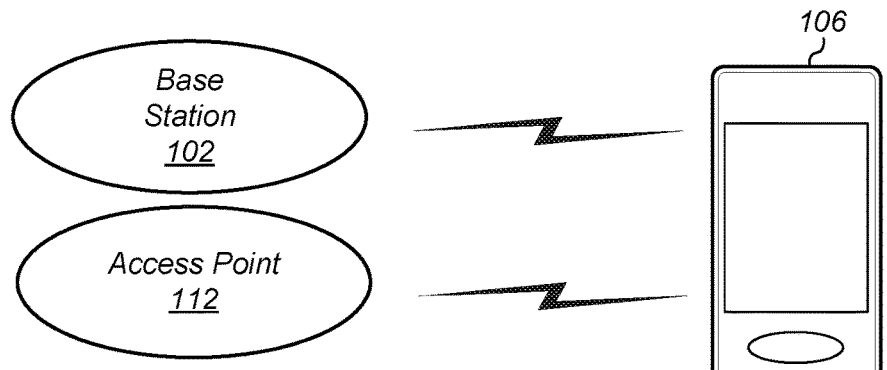
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may perform flexible downlink control signal monitoring during wireless communications, e.g. during 3GPP LTE and/or NR communications, according to various embodiments disclosed herein.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, neutral host or various CBRS (Citizens Broadband Radio Service) deployments, among various possibilities). Thus, the base station 102 may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1xRTT, 1xEV-DO, HRPD, eHRPD), Wi-Fi, WiMAX etc. Note that if the base station(s) 102 are implemented in the context of LTE, they may alternately be referred to as an 'eNodeB' or 'eNB'. Note that if the base station 102A is implemented in the context of 5G NR, it may alternately be referred to as 'gNodeB' or 'gNB'. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to CBRS. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services. Base station 102A and other similar base stations (such as base stations 102B . . . 102N) operating according to the same or a different cellular communication standard may thus be provided as a network of cells, which may provide continuous or nearly continuous overlapping service to UEs 106A-106N and similar devices over a geographic area via one or more cellular communication standards.

Thus, while base station 102A may act as a "serving cell" for UEs 106A-106N as illustrated in FIG. 1, each one of UE(s) 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-102B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE(s) 106 may be capable of communicating using multiple wireless communication standards. For example, a UE might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, UE(s) 106 may also communicate with Network 100, through one or more base stations or through other devices, stations, or any appliances not explicitly shown but considered to be part of Network 100. UE(s) 106 communicating with a network may therefore be interpreted as the UE(s) 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

As also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting with the vehicles represented by UEs 106D and 106E in a similar manner. Further aspects of vehicles communicating in network exemplified in FIG. 1 are described, for example, in the context of vehicle-to-everything (V2X) communications such as the communications specified by 3GPP TS 22.185 V 14.3.0, among others.

FIG. 2 illustrates an exemplary user equipment 106 (e.g., one of the devices 106-1 through 106-N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include a shared radio for communicating using either of LTE or CDMA2000 1xRTT or NR, and separate radios for communicating using each of Wi-Fi and BLUETOOTH™. Other configurations are also possible.

Figure 3:
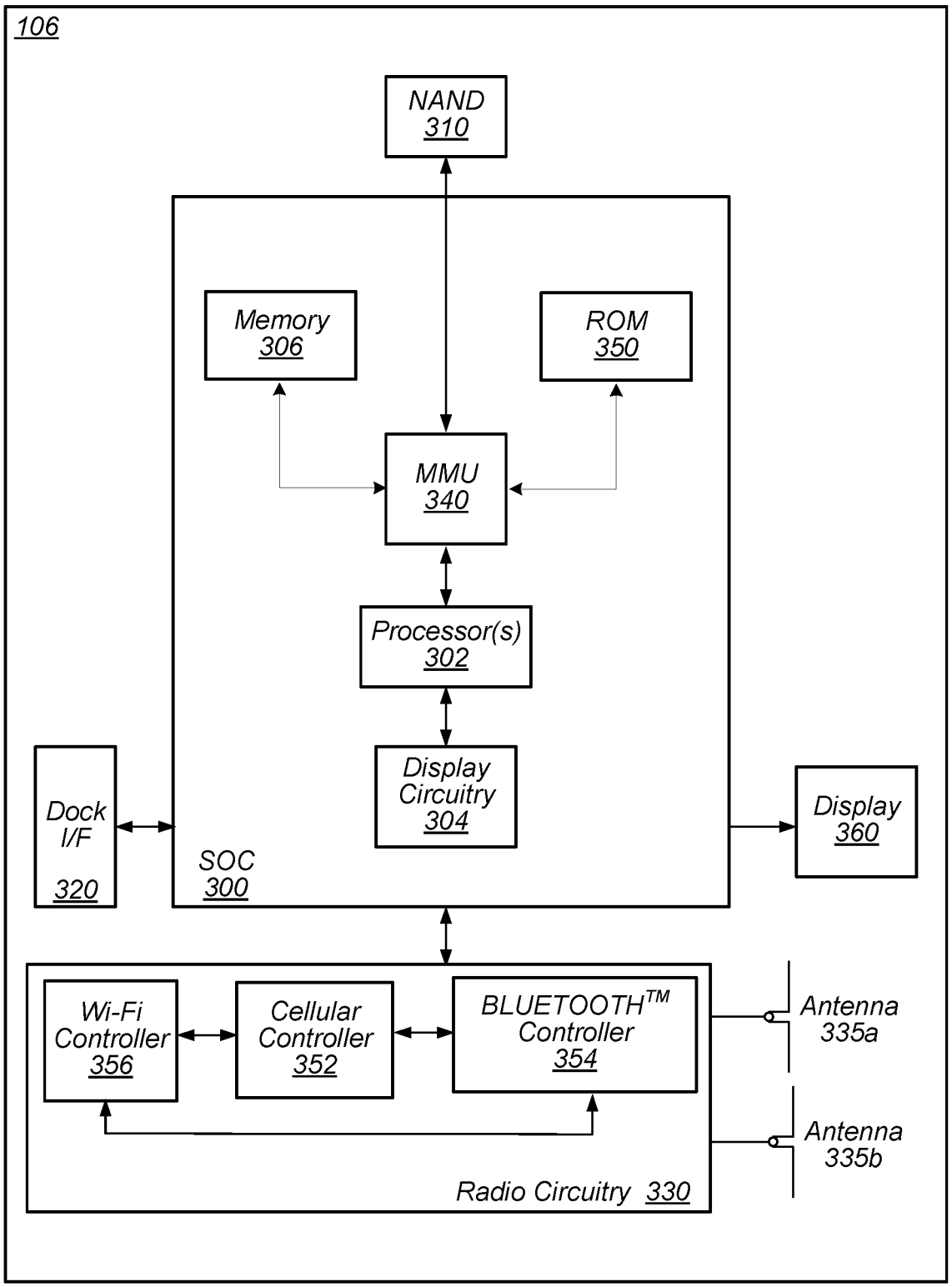
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to perform flexible downlink control signal monitoring during wireless communications, e.g. during 3GPP LTE and/or NR communications as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform flexible downlink control signal monitoring during wireless communications, e.g. during 3GPP LTE and/or NR communications according to various embodiments disclosed herein. Processor(s) 302 may also implement various other applications and/or end-user applications running on UE 106.

Figure 5:
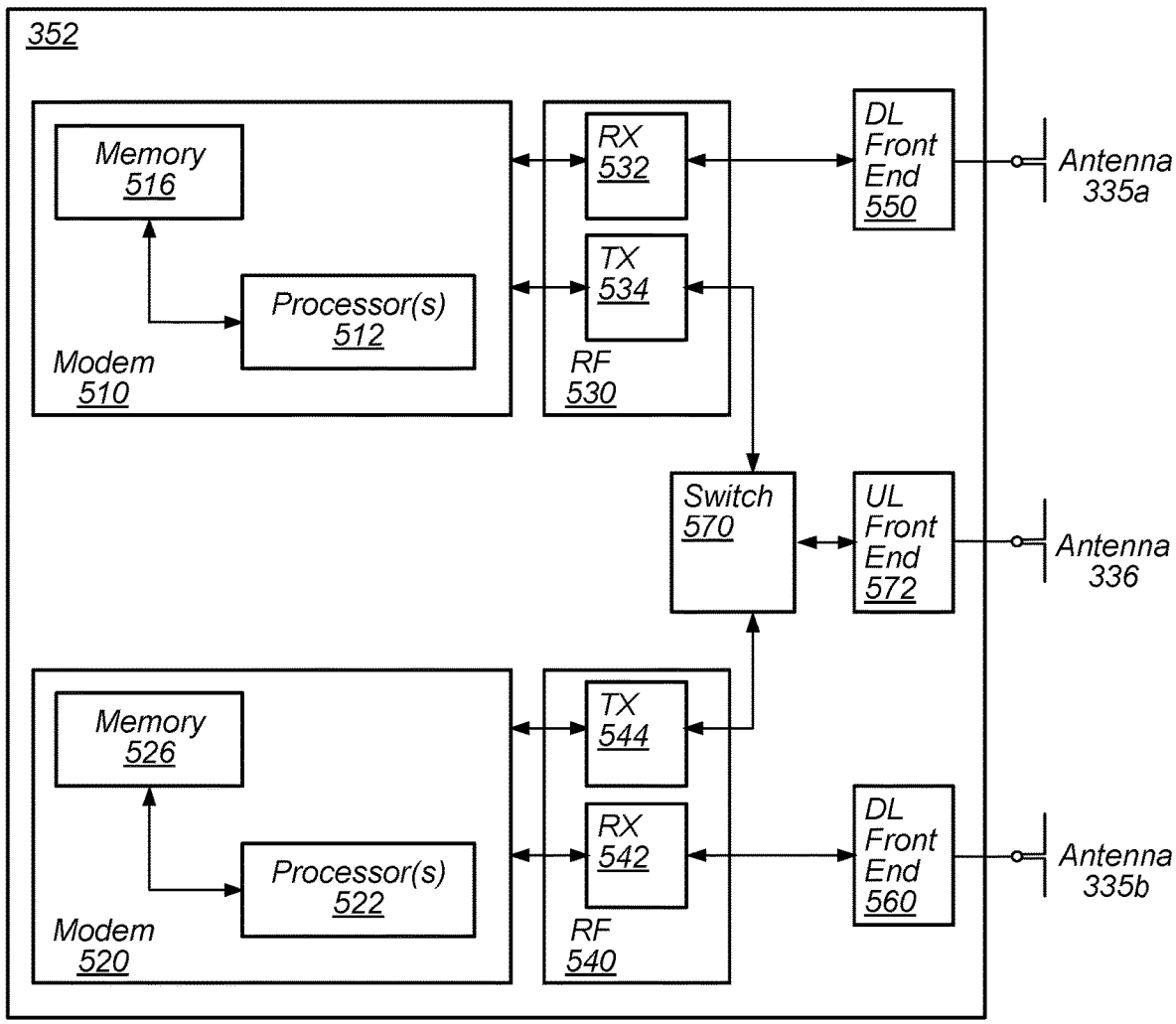
FIG. 5 shows an exemplary diagram illustrating cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 and will be further described below.

Figure 4:
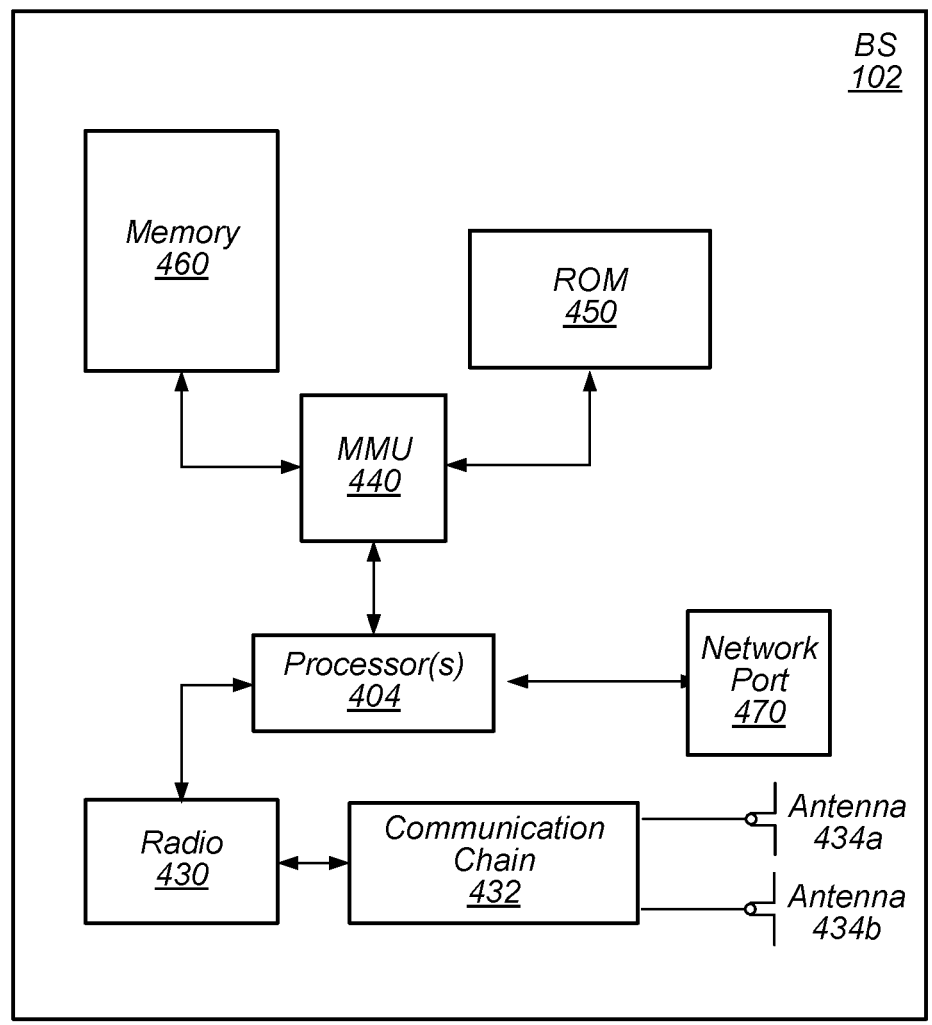
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, (e.g. illustrated by antennas 434*a* and 434*b*) for performing wireless communication with mobile devices and/or other devices. Antennas 434*a* and 434*b* are shown by way of example, and base station 102 may include fewer or more antennas. Overall, the one or more antennas, which may include antenna 434*a* and/or antenna 434*b* are collectively referred to as antenna(s) 434. Antenna(s) 434 may be configured to operate as a wireless transceiver and may be further configured to communicate with UE devices 106 via radio circuitry 430. The antenna(s) 434 communicate with the radio 430 via communication chain 432. Communication chain 432 may be a receive chain, a transmit chain or both. The radio 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device which performs flexible downlink control signal monitoring during wireless communications, e.g. during 3GPP LTE and/or NR communications. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods and embodiments as disclosed herein for communicating with UEs that perform flexible downlink control signal monitoring during wireless communications, e.g. during 3GPP LTE and/or NR communications.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335*a-b* and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Carrier Aggregation, Bandwidth Parts, and Search Spaces

As previously mentioned, wider transmission bandwidths for wireless communications may be supported through carrier aggregation (CA) in which communications take place over two or more component carriers (CCs). For example, a wireless communication device (UE) may simultaneously receive or transmit on multiple CCs depending on the UE's capabilities. With CA configured, the UE may maintain one RRC connection with the network, with the RRC connection managed by a Primary Cell (PCell). Additional or Secondary Cells (SCells) together with the PCell form a set of serving cells for the UE.

Part of cellular wireless communications is the monitoring for downlink control channels, for example the physical downlink control channel (PDCCH). The resource grid where PDCCH may be carried is referred to as the PDCCH search space set, or search space (SS) set for short. As used herein, the term "search space" (SS) and "search space set" (SS set) are used interchangeably to represent the search space sets with which UEs may be configured for monitoring, e.g. PDCCH SS sets for PDCCH monitoring. The concept of SS for 3GPP NR is similar to the concept of SS for 3GPP LTE, though some of their respective implementation details may differ. The UE may perform blind decoding throughout the search space in an attempt to find and decode the PDCCH intended for the UE, for example to decode downlink control information (DCI). The UE may be provided information, e.g. through predefined rules or signaling by the network, regarding the predefined region that may carry the PDCCH (DCI). The UE attempts to decode the PDCCH within this region, using various different types of parameters (e.g., control channel element [CCE] Index, Aggregation Level, radio network temporary identifier [RNTI], etc.) In short, the predefined region in which the UE performs the blind decoding is referred to as the search space.

There are two types of search spaces, a UE-specific search space and a common search space. The UE-specific search space is dedicated to a specific UE which may be informed of its UE-specific search space via higher layer signaling, e.g. via radio resource control (RRC) signaling. Thus, the UE first needs to establish an RRC connection with the network to obtain the information regarding its UE-specific search space. Common search space refers to the specific search space that every UE in a given group of UEs may search for signals/channels intended for each different UE) or signaling messages intended for each UE before respective dedicated channels are established for specific UEs. Each UE may be configured with control resource sets for a UE specific search space and for a common search space.

In 3GPP NR, a CORESET is a set of physical resources (e.g. a specific area a downlink resource grid) and a set of parameters used to carry PDCCH. It is analogous to the PDCCH area (the first 1,2,3,4 OFDM symbols in a subframe) in 3GPP LTE. However, in the LTE PDCCH region the PDCCH is spread across the entire channel bandwidth, while a CORESET region in 3GPP NR is localized to a specific region in the frequency domain. For example, while the control region in 3GPP LTE is spread across the entire channel bandwidth, a 3GPP NR CORESET is localized within each bandwidth part (BWP). A BWP (or carrier BWP) is a contiguous set of physical resource blocks selected from a contiguous subset of the common resource blocks for a given numerology on a given carrier. For the downlink, the UE may be configured with up to a specified number of carrier BWPs (e.g. four BWPs, per current specifications), with only one BWP per carrier active at a given time. For the uplink, the UE may similarly be configured with up to several (e.g. four) carrier BWPs, with only one BWP per carrier active at a given time. If a UE is configured with a supplementary uplink, then the UE may be additionally configured with up to the specified number (e.g. four) carrier BWPs in the supplementary uplink, with only one carrier BWP active at a given time.

Flexible Downlink Control Signal Monitoring

In 3GPP LTE and NR alike, the media access control (MAC) control element (CE) is used for activating/deactivating a SCell. One problem with this approach is the length of the transition time between deactivation and activation, which may span tens of milliseconds (e.g. 24 ms to 32 ms). Due to such large delays it may be risky for the network to frequency deactivate the SCell. However, keeping SCells in a perpetual active state may result in excessive power consumption due in part to unnecessary PDCCH monitoring even when no data transmissions for the UE are scheduled. At the same time, there have been ongoing efforts to minimize the signaling overhead and latency required for initial cell setup, additional cell setup, and additional cell activation for data transmission. Therefore, enhancements are being considered for different operating modes, including idle, inactive, and connected modes of operation. Various systems and methods disclosed herein facilitate fast-switching PDCCH-monitoring by UEs on SCells, which provides benefits in terms of a reduction in power consumption and signaling overhead, as well as a reduction in data scheduling delays on SCells.

In some embodiments, two states may be supported for PDCCH-monitoring behavior on an active BWP on an activated SCell in CA. In a first state, referred to as "dormant state" (DS), the UE may not need to monitor any PDCCH candidates on the active SCell. Alternately, while in a DS, the UE may monitor PDCCH candidates in the SS set having the largest monitoring periodicity among the multiple SS sets configured by higher layers, (e.g. via RRC signaling) on the active BWP. In a second state, referred to as "active state" (AS), the UE may monitor a set of PDCCH candidates in CORESETs that are configured by higher layers on the active BWP. In some embodiments, an active SCell may be configured to start with one or multiple BWPs (e.g. up to 4 BWPs) in DS or AS.

Figure 6:
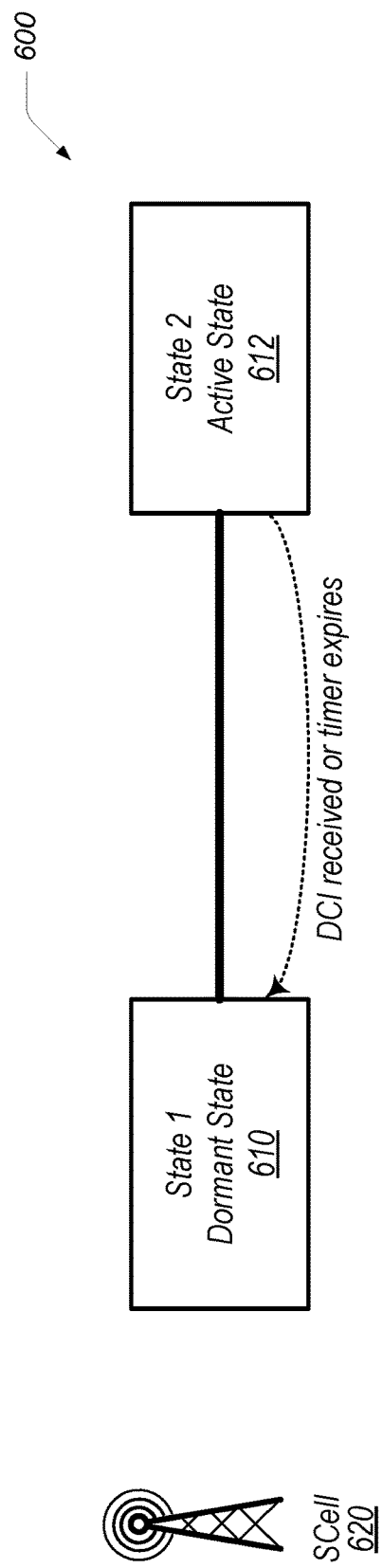
FIG. 6 shows an exemplary state diagram illustrating fast state-switching for physical control channel monitoring, according to some embodiments.

FIG. 6 shows an exemplary state diagram 600 illustrating fast state-switching for physical control channel monitoring. As shown in state diagram 600, a UE configured with CA may be triggered to switch between DS 610 and AS 612 for PDCCH monitoring on a SCell 620 according to a variety of scenarios or combinations thereof. In some embodiments, flexible downlink control signal monitoring, including transitioning between DS and AS, may be implemented using Downlink Control Information (DCI) format without data scheduling, an uplink or downlink DCI format that includes data scheduling, and/or timer-based triggering. For example, as shown in FIG. 6, the UE may transition from AS 612 to DS 610 upon receiving DCI without data scheduling, or upon expiration of a timer.

Use of Downlink Control Information (DCI) Format Without Data Scheduling

Figure 7:
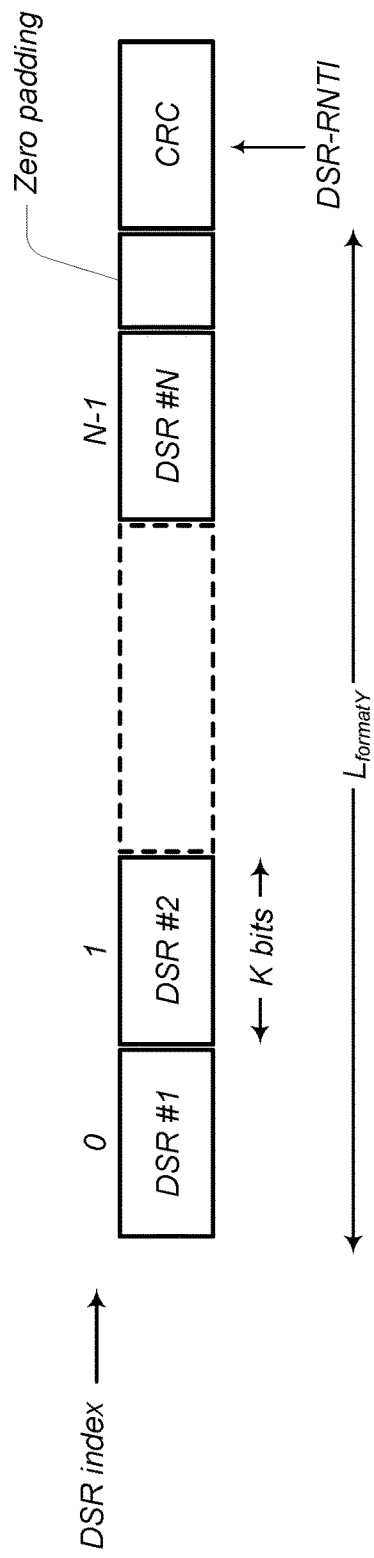
FIG. 7 shows a diagram of an exemplary downlink control information (DCI) format used for dynamically switching between physical control channel monitoring states, according to some embodiments.

Pursuant to the above, a new DCI format (referred to as DCI format X, or DCIX for short) may be introduced and used for the transmission of a group of DS requests (DSRs) to trigger switching from DS to AS for PDCCH monitoring on a SCell for one or more UEs. Information transmitted by means of DCIX may include a number of DSRs, for example DSR #1, DSR #2 . . . DSR #N as illustrated in FIG. 7. N may be defined as $$N = \left\lfloor \frac{L_{formatY}}{K} \right\rfloor$$

where $L_{formatY}$ indicates the payload size of DCIX exclusive of the CRC attachment, and K is the number of bits used for indicating the value of DSR, where the value of K may be fixed or configured by higher layers, e.g. via higher layer signaling such as RRC signaling. The UE may be provided by higher layers (or via higher layer signaling) with a DSR index. The UE may use the DSR index to determine which DSR command within the DCIX is intended for the UE. As shown in FIG. 7, the DCIX may have a corresponding DSR index for each DSR, and the DSR index assigned or provided to the UE may be used by the UE to identify the DSR intended for the UE within DCIX. If $$\left\lfloor \frac{L_{formatY}}{K} \right\rfloor < \frac{L_{formatY}}{K},$$

zero-padding may be applied to append zero to DCIX. The DCIX CRC may be scrambled by a dedicated Radio Network Temporary Identifier (RNTI) referred to as a DSR-RNTI, to differentiate DCIX among DCI formats having the same size. In addition, DCIX may be transmitted in common search space (CSS) targeting a group of UEs, with each UE of the group of UEs assigned one or multiple dedicated DSR fields for corresponding SCells. FIG. 7 provides one example of DCIX, which includes a specified number "N" of DSR information elements (IEs). For example, the UE may be provided with DSR-Index=1 for one or multiple SCell PDCCH monitoring state switching occasions. Then, correspondingly, the UE may determine the PDCCH monitoring state for the corresponding or associated SCell(s) based on the values indicated by the IE DSR#2 (at DSR index 1).

Figure 8:
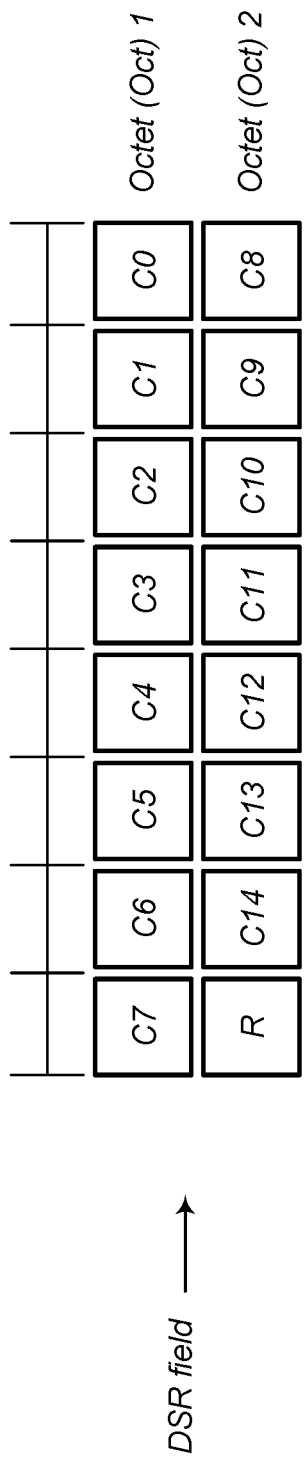
FIG. 8 shows a diagram illustrative of an exemplary dormant state request (DSR) field using a bitmap indication, according to some embodiments.

In some embodiments, a bitmap approach may be used to trigger the switching from DS to AS. FIG. 8 shows a diagram illustrative of a DSR field using a bitmap indication. As shown in FIG. 8, the DSR field includes two octets, Octet 1 and Octet 2, each octet including 8 indicator bits denoted as Ci, e.g. C0, C1, etc. The Ci value indicates the PDCCH monitoring state of the SCell with SCellIndex "i" if there is a SCell associated with SCellIndex i. That is, the value of Ci indicates what monitoring state of the UE should be for PDCCH monitoring for the SCell associated with the index "i". For example, the value of C4 may indicate the physical control channel monitoring state of the UE for the corresponding SCell associated with index "4". In some embodiments, the Ci field may be set to '0' to indicate that the monitoring for the SCell with SCellIndex i is to be in a DS state, and it may be set '1' to indicate that the monitoring for the SCell with SCellIndex i is to be in an AS state. The field size, e.g. the value of "K" for one DSR IE associated with a certain UE (as indicated in FIG. 7, for example) may be determined by the number of active SCells or largest SCell index. In some embodiments this may range from 1 to 15 bits if the maximum number of CCs supported by the UE is 16. With this approach, the value of K may be different for different DSR IEs within a DCI format since the value of K is determined by the number of active SCells for different UEs.

Figure 9:
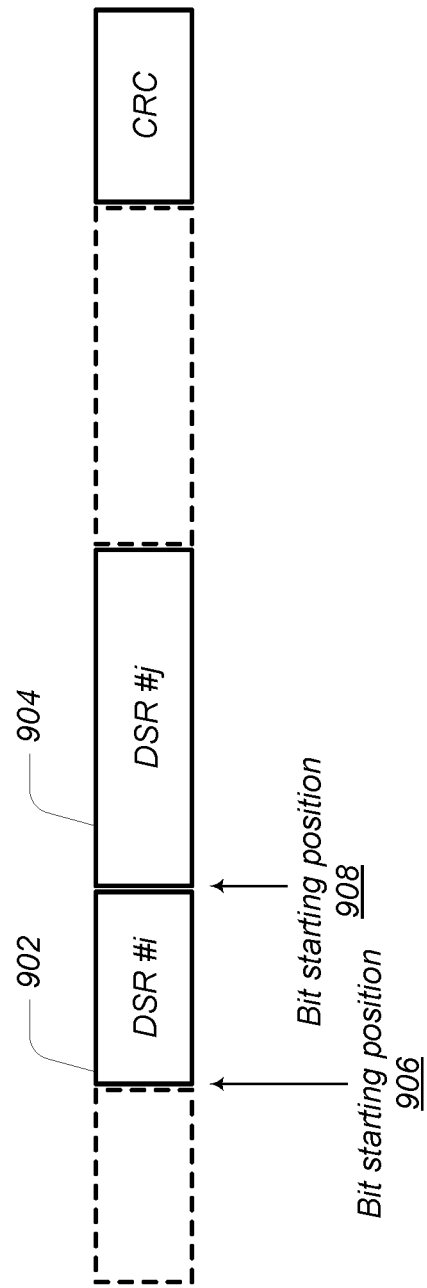
FIG. 9 shows a diagram illustrative of an exemplary group-common DCI format with variable size DSR information elements (IEs) for different UEs, according to some embodiments.

For example, referring to FIG. 9, assuming a first UE (UE1) is configured with 3 CCs (e.g. one PCell and two active SCells), and a second UE (UE2) is configured with 8 CCs (e.g. one PCell and seven active SCells), the K value of DSR IE 902 for UE1 may be 2 bits and the K value of DSR IE 904 for UE2 may be 7 bits. In some embodiments, in order to support the possibility of DSR IEs with different values of K in a same DCIX, UEs may be provided with corresponding starting bit positions, illustrated as starting bit position 906 corresponding to UE1 and starting bit position 908 corresponding to UE2 for the associated DSR fields 902 and 904, respectively, via higher layer signaling, e.g. via RRC signaling.

In some embodiments, a UE that is configured with more than one serving cell (e.g. more than one PCell) may be configured with different sets of SCells (as exemplified in Table 1 in FIG. 10) or different sets of {SCell, BWP} pairs (as exemplified in Table 2 in FIG. 10) to associate with different respective values of dormant state request (DSR) fields. Table 2 may be used if there are multiple BWPs configured within a SCell. As indicated in Table 1, the respective 2-bit values of the DSR field may indicate whether there is a change in the monitoring state from DS to AS ("00" indicates no change of state from DS to AS), and may also indicate the SCells for which the monitoring state should change when there is a change in the monitoring state (e.g. "01" indicates a change in the monitoring state from DS to AS for a first set of associated SCells, etc.) Similarly, as indicated in Table 2, the respective 2-bit values of the DSR field may indicate whether there is a change in the monitoring state from DS to AS ("00" indicates no change of state from DS to AS), and may also indicate the {SCell, BWP} pairs for which the monitoring state should change when there is a change in the monitoring state (e.g. "01" indicates a change in the monitoring state from DS to AS for a first set of associated {SCell, BWP} pairs, etc.) It should be noted that the examples provided in Table 1 and Table 2 are by no means exhaustive, and alternative embodiments may of course include values of K that are different than those shown, with certain values of the DSR field potentially reserved for future use, with values of the DSR field representative of different SCell and/or BWP combinations as desired, etc.

One example of an ASN.1 code for implementing this design is provided below:

```
DSR-v1610      ::=         CHOICE {
  release                  NULL,
  setup                    SEQUENCE {
  DSR-Trigger-v1610        SEQUENCE {
    trigger1-r16           BIT STRING (SIZE (15)),
    trigger2-r16           BIT STRING (SIZE (15)),
    trigger3-r16           BIT STRING (SIZE (15))
  }}}
```

Referring to the exemplary code above, for the respective IEs of trigger1-r16, trigger2-r16, and trigger3-r16, the leftmost bit (e.g., bit 0 in the bit string) corresponds to the cell with SCell_Index_i=0, the next bit (e.g. bit 1 in the bit string) corresponds to the cell with SCell_Index_i=1, the next bit (e.g. bit 2 in the bit string) corresponds to the cell with SCell_Index_i=2, and so on for all active SCells. Each bit may either have a value of 0 (which may indicate that switching from DS to AS is not triggered for that SCell), or a value of 1 (which may indicate that switching from DS to AS is triggered for the SCell). The DCI format may be monitored in the common search space (CSS).

Figure 11:
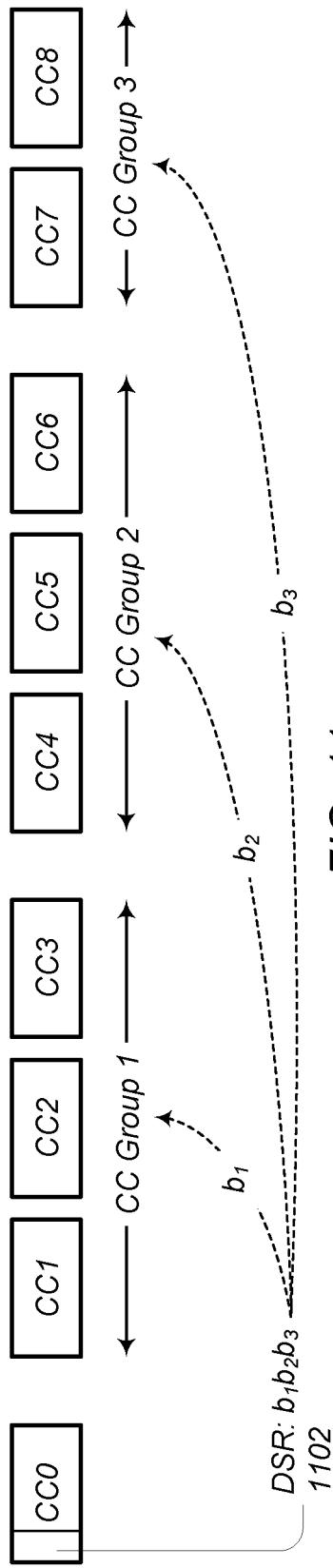
FIG. 11 shows a diagram illustrative of an exemplary component carrier (CC) grouping for DSR indication, according to some embodiments.

In some embodiments, in order to reduce signaling overhead associated with the bitmap method (e.g. as illustrated in FIGS. 8-10), the SCells assigned to a given UE may be divided into multiple groups via higher layer signaling, e.g. via RRC signaling. Furthermore, a bitmap that includes one bit per CC group may be added in the DSR field to indicate the switching from a DS to an AS for the PDCCH monitoring on active BWPs of each active CC. FIG. 11 shows a diagram illustrative of one such example of CC grouping for DSR indication. As shown in FIG. 11, the number of groups is represented by the number of bits in DSR field 1102, with those bits controlled by the network (e.g. by a base station; gNB in case of 3GPP NR) with balanced signaling overhead and DSR switching flexibility. Each bit in DSR IE 1102 may be used to indicate the DS to AS switching for all CCs in a group. For example, a first bit ($b_1$) may indicate the switching between monitoring states for CC group 1 which includes three CCs, a second bit ($b_2$) may indicate the switching between monitoring states for CC group 2 which includes three CCs, and the third bit ($b_3$) may indicate the switching between monitoring states for CC group 3 which includes two CCs. In order to ensure the robustness of group-common PDCCH reception, the UE may transmit a switching (of monitoring state) confirmation media access control (MAC) control element (CE) to acknowledge the reception. In some embodiments, this confirmation MAC CE may be identified by a MAC subheader with a dedicated and predefined logical channel identifier (LCID). The MAC CE may be of a fixed size and have a value set to zero. For example, the size of the MAC CE may be fixed to an octet (8 bits), with each bit set to zero.

Use of DCI Format Inclusive of Data Scheduling

Figure 12:
FIG. 12 shows a diagram illustrative of an exemplary DCI format based on existing DCI scheduling, according to some embodiments.

FIG. 12 shows a diagram illustrative of an exemplary DCI format based on existing DCI scheduling, e.g. based on DCI scheduling defined in Rel-15 of the 3GPP NR standard, which is also used for scheduling data. As shown in FIG. 12, a DSR field 1202 associated with a set of higher-layer configured, e.g. RRC-configured, SCell or {SCell, BWP} pairs (as exemplified in Table 1 and Table 2, respectively, in FIG. 10) may be added to the Rel-15 DCI format (1204) transmitted in PDCCH candidates in a UE-specific search space (USS) used for data scheduling. In other words, a DSR field 1202 indicative of switching between monitoring states for SCells or {SCell, BWP} pairs may be added to DCI used for scheduling data for the UE for (or on) another cell, for example for a PCell. The presence of DSR field 1202 may be configurable on a per-CC basis to minimize the signaling overhead. In some embodiments, the DSR field may be configured to be present on PCell or PSCell (Primary SCell) or scheduling cells in case of cross-carrier scheduling.

In some embodiments, a bitmap approach may be alternatively used for DSR field 1202. The UE may be configured via higher-layer signaling, with the cell signaling the DCI format (shown in FIG. 12) that includes a bitmap-based DSR. In addition, the UE may be configured with a bitmap position within the DSR field for a given CC. A first value, for example a value of "0" may indicate switching to DS from AS, while a second value, for example a value of "1" may indicate remaining in AS. Alternatively, if the value is toggled across two consecutive DSRs, it may indicate a switch from AS to DS.

Figure 13:
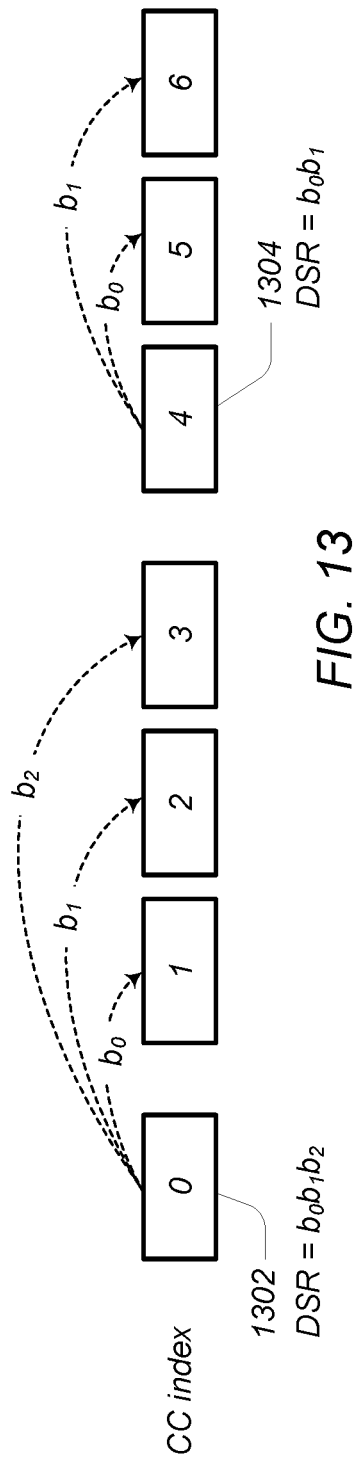
FIG. 13 shows a diagram illustrative of an exemplary CC grouping and per-group DSR indication, according to some embodiments.

FIG. 13 shows a diagram illustrative of an exemplary CC grouping and per-group DSR indication which may be used to control signaling overhead of DSR. CC#1, CC#2, and CC#3 are grouped together and configured to monitor the 3-bit DSR field on CC#0 1302. Similarly, CC#5 and CC#6 are grouped together and configured to monitor the 2-bit DSR field on CC#4 1304. The size of the DSR field may be thereby reduced from 6-bits to 3-bits and distributed on two CCs.

Figure 14:
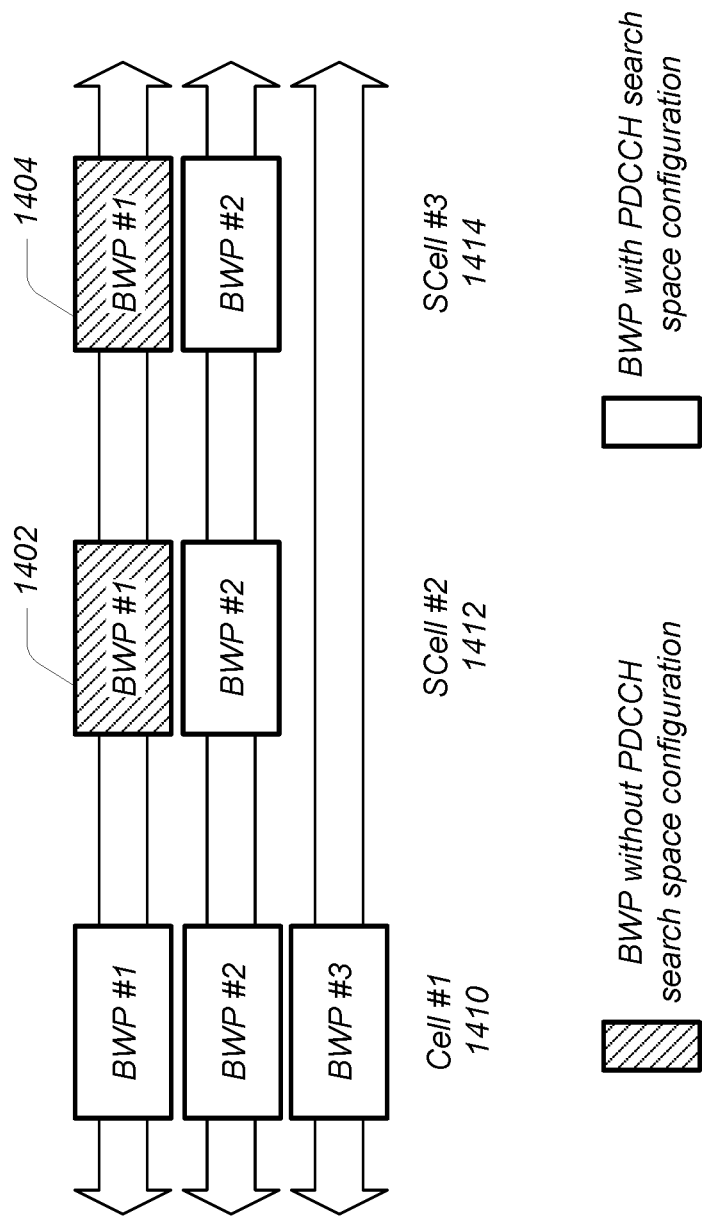
FIG. 14 shows a diagram illustrative of bandwidth parts (BWP) not having physical downlink control channel (PDCCH) search space (SS) configured to enable group-based BWP monitoring state switching, according to some embodiments.

In some embodiments, when the UE is configured with the carrier indicator field and multiple BWPs for a given serving cell, the UE may use the carrier indicator field (CIF) value and BWP indicator value to determine the BWP and the associated serving cell for the corresponding DS to AS switching. FIG. 14 shows a diagram illustrative of BWPs not configured with PDCCH SS to enable group-based BWP monitoring state switching. As shown in FIG. 14, at least one of BWPs 1402 and 1404 of respective corresponding active SCells 1412 and 1414 may be respectively configured without any search space for PDCCH monitoring. For example, if a BWP indicator field is configured and the UE detects a DCI format indicating an active downlink (DL) BWP change for a CC #X e.g. Cell #1 1410 in FIG. 14, the BWP change may be applied to all CCs within the CC group that includes CC #X, e.g. Cell #1 1410, SCell #2 1412 and SCell #3 1414 in FIG. 14. The CC grouping may be implemented by higher layers, e.g. via higher layer signaling such as RRC signaling.

Use of DS Timer

Figure 15:
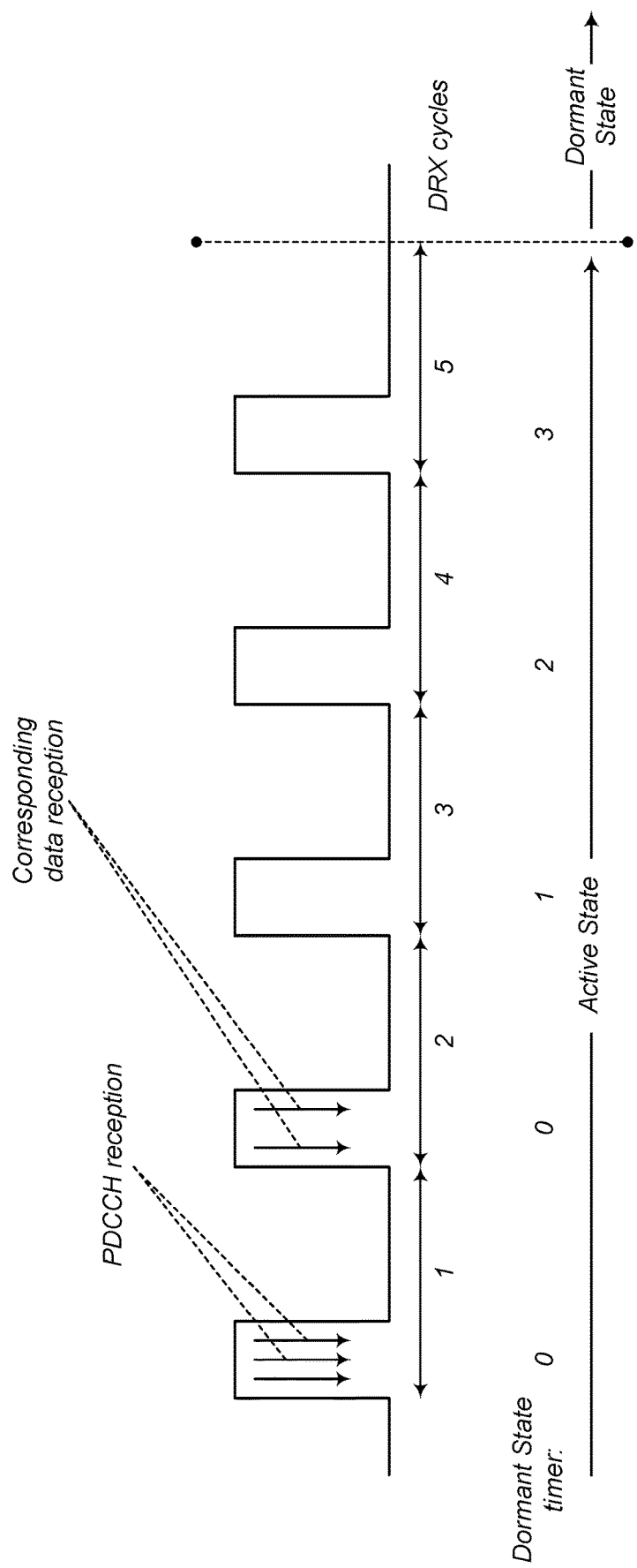
FIG. 15 shows a timing diagram illustrative of an exemplary timer-based monitoring state switching, according to some embodiments.

In some embodiments, a DS timer may be introduced to trigger switching from AS to Dormant State DS. In some embodiments, as illustrated in FIG. 15, the DS timer may specify the number of consecutive DRX cycles after the DRX cycle for which a PDCCH indicates an initial DL, UL or SUL user data transmission for the corresponding MAC entity. In the example in FIG. 15, the DS timer value is set to 3. As indicated in FIG. 15, the DS timer is not running during the first two DRX cycles (cycles 1 and 2), when PDCCH reception and data reception, respectively, are taking place. Following the second DRX cycle (cycle 2), the DS timer may begin to count, and once the DRX cycle at which the DS timer count reaches 3 ends, the UE may switch monitoring states from AS to DS. In alternate embodiments, the DS timer may specify the number of consecutive slot(s) or PDCCH monitoring occasion(s) during which there are no PDCCH receptions. The UE may maintain the DS timer and start or restart the timer with a predetermined value or a value configured by higher layers, e.g. via higher-layer signaling such as RRC signaling by the network (e.g. by a gNB). In some embodiments, the UE may start or restart the DS timer associated with a SCell upon reception of a PDCCH addressed to C-RNTI, CS-RNTI, and/or MCS-RNTI. When the timer expires for a given SCell, the UE may consider switching the monitoring state for the given SCell from AS to DS. Correspondingly, UE may monitor the PDCCH on the given SCell subject to the definition of the DS state.

In some embodiments, when the UE receives a group-common DCI format (e.g. when using DCIX as previously described) or a UE-specific DCI format (e.g. when using DCI format inclusive of data scheduling as previously described) or the DS timer expires, and the UE subsequently switches its PDCCH monitoring state between AS and DS, the UE may be allowed to cause interruption of up to a specified number of slots to other active serving cells. The need for such interruption when switching monitoring states may be indicated as part of the UE capability. In addition, the value of the number of slots may be defined separately for different subcarrier space configurations (e.g. 15 kHz, 30 kHz, 60 kHz, 120 kHz, etc.)

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to:
cause a device to wirelessly communicate according to a first radio access technology (RAT) on a plurality of cells of a carrier aggregation configuration;
cause the device to operate at any given point in time in a first state (FS) for a first group of active cells of the plurality of cells and in a second state (SS) for a second group of active cells of the plurality of cells, wherein in the FS for a given cell the device does not monitor physical downlink control channel candidates for the given cell, and wherein in the SS for the given cell the device monitors physical downlink control channel candidates on physical resources configured by higher layers on a respective active bandwidth part (BWP) for the given cell; and
cause the device to switch, in response to a request received from a serving cell of the device, from operating in the FS to operating in the SS for at least one of:
at least one cell of the first group of active cells when the request is received in downlink control information, DCI, wherein the DCI also includes data scheduling for the serving cell, and
a first sub-group of cells of the first group of active cells when the request comprises multiple bits, and a single bit of the multiple bits corresponds to a specific group of cells that includes the first sub-group of cells.

2. The apparatus of claim 1, wherein the processor is configured to further cause the device to switch from operating in the FS to operating in the SS for at least another cell of the first group of active cells in response to receiving the request in special DCI that does not include data scheduling.

3. The apparatus of claim 2, wherein the special DCI includes a plurality of requests associated with a specific cell of the plurality of cells, each of the plurality of requests intended for a corresponding device of a group of devices;
wherein the processor is configured to further cause the device to:
receive an index via higher-layer signaling; and
identify, using the index, which of the plurality of requests is intended for the device.

4. The apparatus of claim 3, wherein the special DCI is transmitted in common search space targeting the group of devices.

5. The apparatus of claim 3, wherein each device of the group of devices is assigned one or more dedicated request fields in the special DCI for corresponding one or more cells of the plurality of cells.

6. The apparatus of claim 1, wherein when the request comprises multiple bits, each different bit of at least a subset of the multiple bits indicates a monitoring state in which the device is to operate for a respective corresponding cell of the plurality of cells.

7. The apparatus of claim 1, wherein the processor is further configured to cause the device to switch from operating in the SS to operating in the FS for one or more cells of the second group of active cells in response to expiration of a timer.

8. A device comprising:
radio circuitry configured to facilitate wireless communications of the device on a plurality of cells of a carrier aggregation configuration; and
a processor communicatively coupled to the radio circuitry and configured to:
instruct the device to operate at any given point in time in a first state (FS) for a first group of active cells of the plurality of cells and in a second state (SS) for a second group of active cells of the plurality of cells, wherein in the FS for a given cell the device does not monitor physical downlink control channel candidates for the given cell, and wherein in the SS for the given cell the device monitors physical downlink control channel candidates on physical resources configured by higher layers on a respective active BWP for the given cell, and instruct the device to switch, in response to a request received from a serving cell of the device, from operating in the FS to operating in the SS for at least one of:
  at least one cell of the first group of active cells when the request is received in downlink control information, DCI, wherein the DCI also includes data scheduling for the serving cell, and
  a first sub-group of cells of the first group of active cells when the request comprises multiple bits, and a single bit of the multiple bits corresponds to a specific group of cells that includes the first sub-group of cells.

9. The device of claim 8, wherein the processor is configured to further instruct the device to switch from operating in the FS to operating in the SS for at least another cell of the first group of active cells in response to receiving the request in special DCI that does not include data scheduling.

10. The device of claim 9, wherein the special DCI includes a plurality of requests associated with a specific cell of the plurality of cells, each of the plurality of requests intended for a corresponding device of a group of devices;
  wherein the processor is configured to further instruct the device to:
    receive an index via higher-layer signaling; and
    identify, using the index, which of the plurality of requests is intended for the device.

11. The device of claim 10, wherein the special DCI is transmitted in common search space targeting the group of devices.

12. The device of claim 10, wherein each device of the group of devices is assigned one or more dedicated request fields in the special DCI for corresponding one or more cells of the plurality of cells.

13. The device of claim 8, wherein when the request comprises multiple bits, each different bit of at least a subset of the multiple bits indicates a monitoring state in which the device is to operate for a respective corresponding cell of the plurality of cells.

14. The device of claim 8, wherein the processor is further configured to cause the device to switch from operating in the SS to operating in the FS for one or more cells of the second group of active cells in response to expiration of a timer.

15. A non-transitory memory element storing instructions executable by a processor to cause a device to:
  wirelessly communicate according to a first radio access technology (RAT) on a plurality of cells of a carrier aggregation configuration;
  operate at any given point in time in a first state (FS) for a first group of active cells of the plurality of cells and in a second state (SS) for a second group of active cells of the plurality of cells, in the FS for a given cell, the device does not monitor physical downlink control channel candidates for the given cell, and wherein in the SS for the given cell the device monitors physical downlink control channel candidates on physical resources configured by higher layers on a respective active BWP for the given cell; and
  switch, in response to a request received from a serving cell of the device, from operating in the FS to operating in the SS for at least one of:
    at least one cell of the first group of active cells when the request is received in downlink control information, DCI, wherein the DCI also includes data scheduling for the serving cell and
    a first sub-group of cells of the first group of active cells when the request comprises multiple bits, and a single bit of the multiple bits corresponds to a specific group of cells that includes the first sub-group of cells.

16. The non-transitory memory element of claim 15, wherein the instructions are executable by the processor to further cause the device to:
  switch from operating in the FS to operating in the SS for at least another cell of the first group of active cells in response to receiving the request in special DCI that does not include data scheduling.

17. The non-transitory memory element of claim 16, wherein the special DCI includes a plurality of requests associated with a specific cell of the plurality of cells, each of the plurality of requests intended for a corresponding device of a group of devices;
  wherein the instructions are executable by the processor to further cause the device to:
  receive an index via higher-layer signaling; and identify, using the index, which of the plurality of requests is intended for the device.

18. The non-transitory memory element of claim 17, wherein the special DCI is transmitted in common search space targeting the group of devices.

19. The non-transitory memory element of claim 15, wherein the instructions are executable by the processor to further cause the device to:
  switch from operating in the SS to operating in the FS for one or more cells of the second group of active cells in response to expiration of a timer.

20. The non-transitory memory element of claim 15, wherein when the request comprises multiple bits, each different bit of at least a subset of the multiple bits indicates a monitoring state in which the device is to operate for a respective corresponding cell of the plurality of cells.

* * * * *

UNITED STATES PATENT AND TRADEMARK OFFICE
CERTIFICATE OF CORRECTION

| | | |
|---|---|---|
| PATENT NO. | : 11,743,749 B2 | Page 1 of 1 |
| APPLICATION NO. | : 17/059187 | |
| DATED | : August 29, 2023 | |
| INVENTOR(S) | : Hong He et al. | |

It is certified that error appears in the above-identified patent and that said Letters Patent is hereby corrected as shown below:

In the Claims

Column 25, Line 2, delete "BWP" and substitute --bandwidth part (BWP)--.

Column 26, Line 8, delete "BWP" and substitute --bandwidth part (BWP)--.

Signed and Sealed this
Seventh Day of November, 2023

Katherine Kelly Vidal
*Director of the United States Patent and Trademark Office*